United States Patent [19]

Umeda et al.

[11] 4,129,000

[45] Dec. 12, 1978

[54] HYDRAULIC TORQUE CONVERTER

[75] Inventors: Haruhiko Umeda, Yokohama; Ryuji Ito, Ebina; Akinori Yokoyama; Mitsuaki Komatsu, both of Yokohama, all of Japan

[73] Assignee: Kabushiki Kaisha Komatsu Seisakusho, Tokyo, Japan

[21] Appl. No.: 805,155

[22] Filed: Jun. 9, 1977

[51] Int. Cl.² ............................................. F16D 33/20
[52] U.S. Cl. ........................................ 60/361; 60/367
[58] Field of Search ........................... 60/361, 362, 367

[56] References Cited

U.S. PATENT DOCUMENTS 3,125,857  3/1964  Schneider ............................. 60/361

FOREIGN PATENT DOCUMENTS 1220712  1/1971  United Kingdom ..................... 60/362

Primary Examiner—Edgar W. Geoghegan
Attorney, Agent, or Firm—Armstrong, Nikaido, Marmelstein & Kubovcik

[57] ABSTRACT

A hydraulic torque converter having a torus provided with a bladed impeller, a bladed turbine and a bladed stator, the portions of the torus between the impeller, the turbine and the stator each being unbladed wherein the turbine is bulged towards a flywheel of a power supply and the impeller generally stands upright relative to an output axis of the converter thereby decreasing the distance between the drive ring gear and the power take off gear.

2 Claims, 3 Drawing Figures

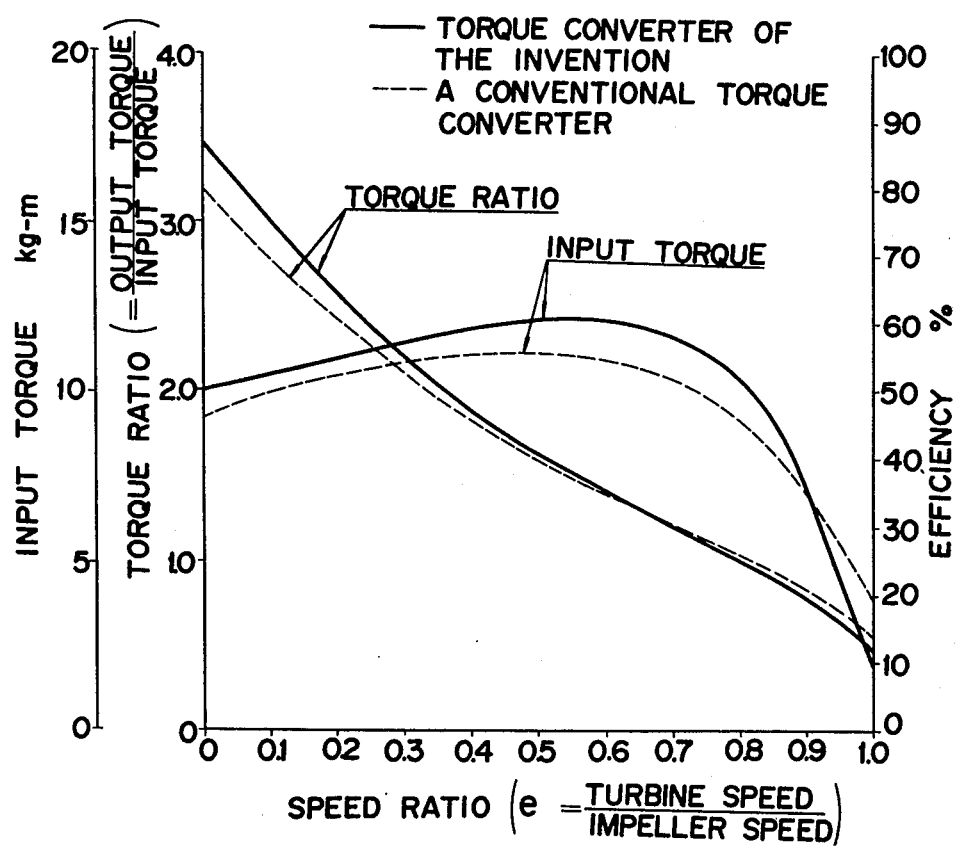

HYDRAULIC TORQUE CONVERTER

BACKGROUND OF THE INVENTION

This invention relates to a hydraulic torque converter having an improved torus wherein the axial distance between a drive ring gear and a power take off gear is reduced. In conventional torque converters, a torus defined by an impeller, a turbine and a stator is generally round shape or pear-shaped as disclosed in U.S. Pat. No. 3,125,857. Because of its structure the axial distance between the drive ring and the power take off gears is relatively long which contributes to the overall converter structure becoming bulky. According to the aforementioned U.S. Pat. No. 3,125,857, a pear or egg-shaped torus is defined by properly coordinating a number of critical factors with continuously curved inner and outer walls wherein the impeller, turbine and stator blades are simply curved between their inlet and outlet tips and are not twisted therebetween.

SUMMARY OF THE INVENTION

It is an object of the present invention to provide a hydraulic torque converter with an improved torus by properly coordinating a number of critical factors thereby reducing the distance between a drive ring gear and a power take off gear.

Another object of the present invention is to provide a hydraulic torque converter wherein the impeller, turbine and stator blades are simply curved between their inlet and outlet tips and are not twisted therebetween.

According to one aspect of the present invention, there is provided, a hydraulic torque converter having an improved torus provided with a bladed impeller, a bladed turbine and a bladed stator, the portions of torus between the impeller, the turbine and the stator each being unbladed wherein the turbine is bulged towards a flywheel of the converter and the impeller generally stands upright relative to an output axis of the converter thereby reducing the distance between the drive ring gear and the power take off gear.

Other objects, features and advantages of the present invention will be readily apparent from the following description taken in conjunction with the accompanying drawings.

BRIEF DESCRIPTION OF THE DRAWINGS

FIG. 3 is a graph showing the performance of the torque converter of the present invention in comparision with that of a conventional hydraulic torque converter.

DETAILED DESCRIPTION OF THE PREFERRED EMBODIMENT

Figure 1:
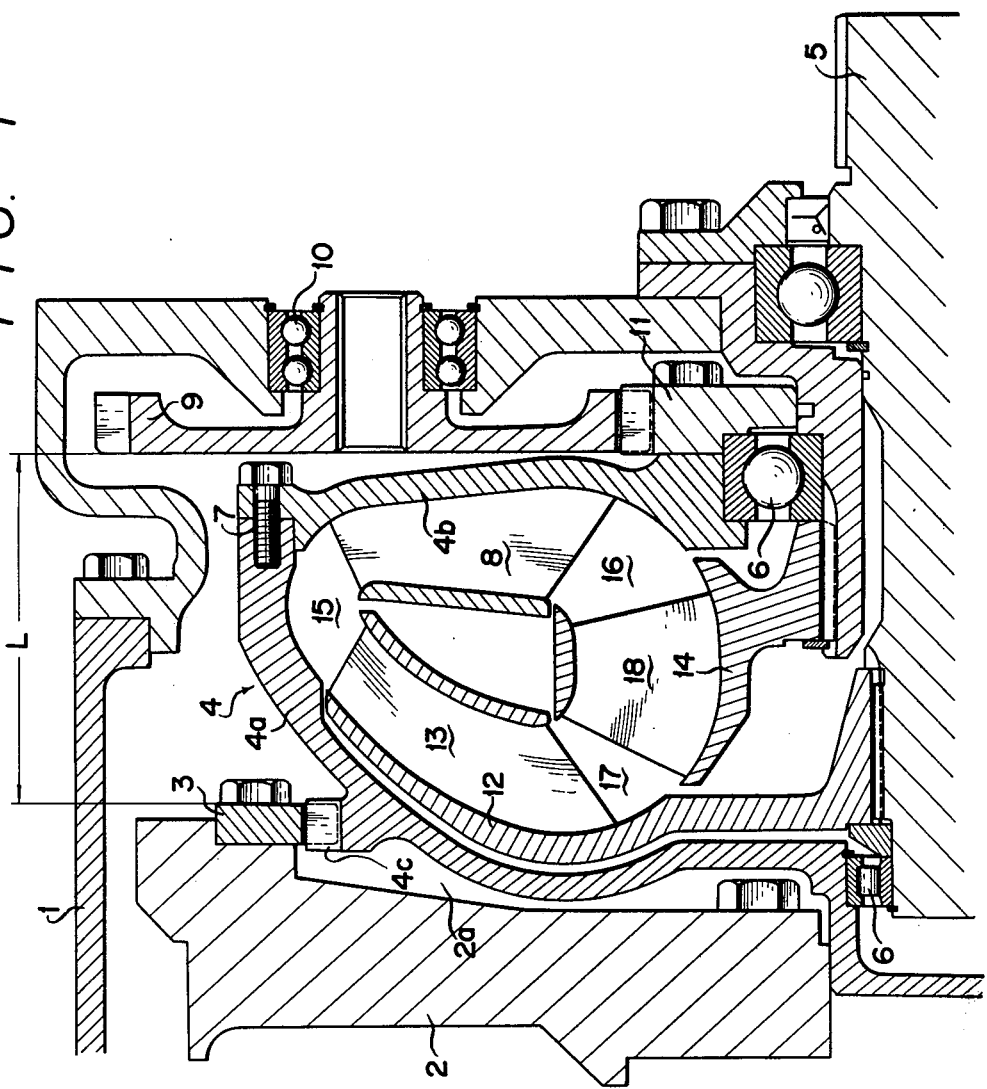
FIG. 1 is a fragmentary, longitudinal sectional view of an improved hydraulic torque converter according to the present invention.

The present invention will now be described in detail below by way of an example only with reference to the accompanying drawings. In FIG. 1, reference numeral 1 denotes a housing and 2 a flywheel of a power supply as shown in SAE standard adapted to be accommodated within the housing 1 so as to be rotated by a power supply not shown. The flywheel 2 has a drive ring gear 3 fixedly secured to one side surface thereof. The drive ring gear 3 is engaged with a gear 4c projecting on the outer peripheral surface of pump casing 4 which is carried by an output shaft 5 through a bearing 6. The above-mentioned pump casing 4 comprises a halved member 4a and an impeller 4b, and the rear portion of the halved member 4a is bulged towards a recess 2a formed on one side of the above-mentioned flywheel 2. The impeller 4b is fixedly secured to the halved member 4a by means of fastener means 7 and has a blade 8 projecting radially from the inner surface thereof. Because of halved member 4a being bulged towards the recess 2a of the flywheel 2, the impeller 4b is formed in a flat shape extending approximately at right angles to the output shaft 5 so that a driven gear or a power take off gear 9 secured at the rear of the impeller 4b can be located close to the impeller. Consequently, the distance "L" between the drive ring gear 3 and the driven gear 9 can be remarkably reduced as compared with that of the conventional hydraulic torque converter. Further, the above-mentioned driven gear 9 is carried by the housing 1 by means of a bearing 10, and is engaged with a gear 11 fixedly secured to the impeller 4b so that the output of power supply transmitted to the flywheel 2 can be directly taken out through the pump casing 4.

The above-mentioned output shaft 5 has a spline formed thereon which is engaged with the base portion of a turbine 12 fixedly secured to the output shaft close to the halved member 4a on the side of the flywheel 2. The turbine 12 is also bulged towards the side of the flywheel 2 along the bulged portion of the halved member 4a, and has a turbine blade 13 projecting from the inner surface thereof opposite to the inner surface of the impeller blade 8. Further, provided between the turbine blade 13 and the impeller blade 8 is a stator 14 fixedly secured to the housing 1. A torus which will be mentioned below is defined or formed by the stator 14, the impeller 4b and the turbine 12.

Figure 2:
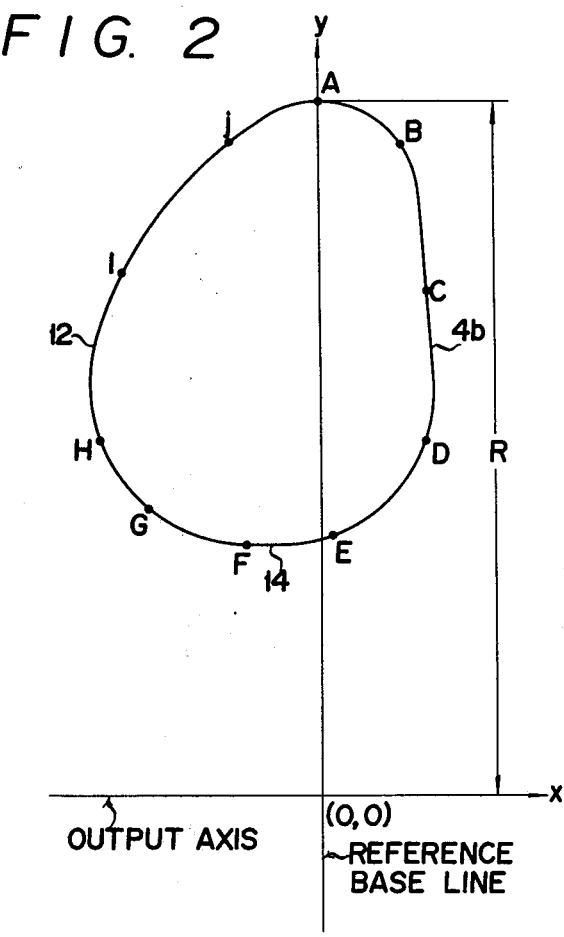
FIG. 2 is a diagrammatic view illustrating the construction defining the shape of the torus.

In brief, as mentioned hereinabove, because of both the halved member 4a of the pump casing 4 and a part of the turbine 12 being formed to bulge towards the recess 2a of the flywheel 2, the impeller 4b can be formed in a flat shape extending approximately at right angles to the output shaft 5 thereby enabling the distance between the drive ring gear 3 and the driven gear 9 to be reduced about 25% as compared with that of a conventional hydraulic torque converter, and in this connection the shape of the torus is defined as mentioned below. Stating in brief, the shapes of inner surfaces of the impeller 4b, the turbine 12 and the stator 14 are formed as shown in FIG. 2 in such a manner that in an X - Y orthogonal coordinate system having the axis of the output shaft 5 as "X" axis, and a reference base line passing through the radially outermost point "A" of the torus and extending at right angles to the "X" axis as "Y" axis, "Y" coordinate of the point "A" is designated by "R", and points A to J are set to have following values and are connected by a smooth curvature thereby determining the overall shape of the torus. Further, no deterioration in performance was observed even when the shape of the torus is changed by 35 10 % in the direction of X axis.

A (0, 1.0000 R)

B [(0.1225 ± 0.0123)R, 0.9335 R]

C [(0.1615 ± 0.0162)R, 0.7225 R]

D [(0.1590 ± 0.0159)R, 0.5065 R]

E [(0.0175 ± 0.0018)R, 0.3650 R]

F [− (0.1100 ± 0.0110)R, 0.3515 R]

G [− (0.2570 ± 0.0257)R, 0.4040 R]

H [− (0.3285 ± 0.0329)R, 0.5060 R]

I [− (0.2990 ± 0.0299)R, 0.7470 R]

J [− (0.1340 ± 0.0134)R, 0.9385 R]

FIG. 3 shows comparison of the performance of the hydraulic torque converter having a torus formed by the above-mentioned values and that of a hydraulic torque converter which has been generally employed. It is apparent from the drawing that the hydraulic torque converter according to the present invention has an improved input torque curve and torque ratio in low speed ratio region as compared with those of a conventional torque converter.

Whilst, in defining the above-mentioned torus, the blades 8, 13 and 18 are usually manufactured by die casting aluminium. In a conventional hydraulic torque converter, the leading and trailing edges of the impeller blade 8, the turbine blade 13 and the stator blade 18 are usually close to one another. Therefore, the blades 8, 13 and 18 are formed in an extremely twisted shape so that for the purpose of die casting these blades the core had to be divided into sections, the number of which is equal to that of the blades. As a result, upon die casting the cores tend to be dislocated so that blades 8, 13 and 18 having predetermined performance could not be obtained. Whilst, according to the present invention, torus portions 15, 16 and 17 having no blades are defined, respectively, between the blades 8, 13 and 18 so that the twist of the blades can be reduced considerably as compared with those of the conventional ones. Consequently, when die casting the blades 8, 13 and 18, wooden cores for the impeller 4b and the turbine 12 can be withdrawn axially, while wooden cores for the stator 14 can be withdrawn radially. Therefore, the impeller 4b, the turbine 12 and the stator 14 can be cast by means of an integrally formed core so that not only the casting can be easily made, but also the dislocation of cores can be eliminated thereby enabling the impeller blade 8, the turbine blade 13 and the stator blade 18 each having a predetermined performance to be readily obtained.

It is to be understood that the foregoing description is merely illustrative of the preferred embodiment of the present invention and that the scope of the present invention is not to be limited thereto, but is to be determined by the scope of the appended claims.

What we claim is:

1. A hydraulic torque converter having a torus provided with a bladed impeller, a bladed turbine and a bladed stator, the portions of the torus between the impeller, the turbine and the stator each having no blade formed thereon, the shape of the torus being defined by a series of design points A to J, inclusive, determined by a system of X and Y coodinates starting from the radially outermost design point A and processing in succession through other design points in a direction opposite to that of the toroidal flow, the coordinate system being related to a converter output axis and a reference base line passing through the radially outermost point of the torus and drawn perpendicular to the output axis as X and Y axes, respectively, the outer wall of the torus being determined by interconnecting each adjacent pair of design points with a continuously changing smooth curvature, wherein the coordinates have values for design points A to J as follows:

A (0, 1.000 R)

B [(0.1225 ± 0.0123)R, 0.9335 R]

C [(0.1615 ± 0.0162)R, 0.7225 R]

D [(0.1590 ± 0.0159)R, 0.5065 R]

E [(0.0175 ± 0.0018)R, 0.3650 R]

F [− (0.1100 ± 0.0110)R, 0.3515 R]

G [− (0.2570 ± 0.0257)R, 0.4040 R]

H [− (0.3285 ± 0.0329)R, 0.5060 R]

I [− (0.2990 ± 0.0299)R, 0.7470 R]

J [− (0.1340 ± 0.0134)R, 0.9385 R]

wherein R is the outermost radius of the torus, positive and negative values being measured in opposite directions, respectively, from the reference base line.

2. A hydraulic torque converter as defined in claim 1, wherein the impeller, turbine and stator blades are curved and devoid of twist between their inlet and outlet tips.

* * * * *

UNITED STATES PATENT AND TRADEMARK OFFICE
CERTIFICATE OF CORRECTION

PATENT NO. : 4,129,000
DATED : December 12, 1978
INVENTOR(S) : HARUHIKO UMEDA ET AL It is certified that error appears in the above-identified patent and that said Letters Patent are hereby corrected as shown below:

On the cover page, after Item [22], insert

--- [30]    Foreign Application Priority Data

May 20, 1976    Japan................. 51-57229

*Signed and Sealed this*

*Fourth* Day of *September 1979*

[SEAL]

Attest:

LUTRELLE F. PARKER

Attesting Officer        Acting Commissioner of Patents and Trademarks